United States Patent Office 3,515,600
Patented June 2, 1970

3,515,600
METAL TREATING PROCESS AND COMPOSITION
William N. Jones, Livonia, and Jefferson W. Ellis, Garden City, Mich., assignors to Hooker Chemical Corporation, Niagara Falls, N.Y., a corporation of New York
No Drawing. Filed Oct. 19, 1966, Ser. No. 587,661
Int. Cl. C23f 7/08
U.S. Cl. 148—6.16                6 Claims

ABSTRACT OF THE DISCLOSURE

A composition for treating zinc and zinc alloy surfaces which is an aqueous alkaline solution containing alkali metal ions, at least one metal ion other than the alkali metal ion, a complexing agent in an amount sufficient to keep the other metal ions in solution and at least 0.75% by weight of the solution of phosphate ions. The preferred metal ions other than the alkali metal ions in the solution are iron and/or cobalt.

---

This invention relates to a composition and process for forming protective coatings on metal surfaces and more particularly it relates to an aqueous alkaline composition and the method of coating zinc and zinc alloy surfaces with this composition.

It has heretofore been well known to prepare the surfaces of zinc and zinc alloys for the reception of paint or similar coatings by treating the surface with aqueous acidic solutions, particularly phosphate solutions. Numerous commercially satisfactory phosphate coating processes are known and in many instances have been found to be completely satisfactory for this purpose. Where, however, the zinc or zinc alloy surfaces are to be formed, subsequent to painting, the phosphate treated surfaces have sometimes exhibited loss of paint adhesion, as well as decreased corrosion resistance to both humidity and salt spray.

To overcome these problems, it has been proposed to treat zinc and zinc alloy surfaces with aqueous alkaline solutions which contain at least one metal ion other than an alkaline metal ion and a complexing agent capable of complexing the metal ions which are present and causing them to remain in solution. Typical of these solutions is a solution containing an alkali metal hydroxide, ferric iron ions, cobalt ions, and a suitable sequestering agent. Although the zinc and zinc alloy surfaces treated with compositions of this type are found to have excellent paint adhesion, and corrosion resistance to both humidity and salt spray, even when the surface is deformed after painting, the treating solutions themselves have sometimes been found to develop sludge during use. This sludge is frequently in the form of a hard, crystalline precipitate which adheres to the processing equipment, often plugging nozzles when spray application of the coating solution is used.

It is, therefore, an object of the present invention to provide an improved aqueous alkaline coating solution of the above type, in which solutions, hard crystalline sludge formation is minimized.

A further object of the present invention is to provide an improved method for coating zinc and zinc alloy surfaces, which method is carried out with an aqueous alkaline coating solution of the above type, with only a minimum development of hard, crystalline sludge in the coating solution during the process.

These and other objects will become apparent to those skilled in the art from the description of the invention which follows.

Pursuant to the above objects, the present invention includes a composition suitable for treating zinc and zinc alloy surfaces which comprises an aqueous alkaline solution containing at least one metal ion other than an alkali metal ion, a complexing agent present in an amount sufficient to hold the metal ions in the solution and at least 0.75% by weight of the solution of phosphate ions. It has been found that with this solution, the development of a hard crystalline sludge precipitate, which characterized similar aqueous alkaline coating solutions but without the phosphate ions, is minimized and plugging of nozzles and other processing equipment is substantially decreased.

More specifically in the present invention, the aqueous alkaline solution used contains at least one metal ion other than, or in addition to, the alkali metal ions, a sufficient quantity of complexing agent to maintain these ions in solution and at least 0.75% by weight of the solution of phosphate ions. Desirably, these alkaline coating solutions have a pH of at least about 11 and preferably have a pH within the range of about 12.6 to 13.3. In some instances, however, the solutions may be operated at other pH values, and in particular lower pH values, then those which have been specifically set forth, to obtain a satisfactory coating on the metal surface. The desired alkalinity of the coating solution may be provided by using many of the common alkali compounds of an alkaline salt, such as alkali metal hydroxides, carbonates, phosphates, borates, silicates, polyphosphates, pyrophosphates, mixtures thereof, and the like. In many instances, the preferred alkaline compounds for use in these compositions have been found to be the alkaline metal hydroxides, and in particular sodium hydroxide.

It is to be appreciated that the term "alkali metal," as used in the specification and claims, is intended to refer to sodium, potassium, lithium, cesium, and rubidium. In many instances, the compounds of sodium have been found to be preferred for use in the composition of the present invention and for this reason, primary reference hereinafter will be made to these materials. This is not, however, to be taken as a limitation of the present invention, as other alkali metal compounds such as the potassium compounds, may also be used.

In addition to the alkali metal ions, the coating solutions used contain at least one other metal ion which is normally introduced with the alkaline salt, in order to produce a rate of coating formation and/or a coating quality which enables the coating to function as a superior base for paint or other coating materials. It has been found, however, that such other metal ions do not function to increase the coating rate or coating formation mechanism unless it is sufficiently complexed by a complexing agent so that the metal ion is dissolved in the coating solution. It has been found that metals falling within each of the groups of the periodic table and including the rare earth metals, which is complexed and in solution functions satisfactorily to improve the formation of the desired coating. Satisfactory coatings have been obtained when using solutions containing an alkali metal ion, such as a sodium ion, and at least one other ion from the group comprising silver, magnesium, cadmium, aluminum, tin, titanium, antimony, molybdenum, chromium, cerium, tungsten, manganese, cobalt ferrous and ferric iron and nickel.

These metal ions, other than the alkali metal ions, need be present in the coating solution in only minor amounts in order to function to improve the formation of the desired coating on the surfaces treated. In many instances, amounts of the metal ion as low as about 0.002% by weight of the coating solution have been found to be quite effective. There has not been found to be any limit on the maximum amount of the metal ions which may be present, amounts up to the limit of the solubility of the ions in the solution being satisfactory. Although large quantities of the metal ions are not detrimental to the coating produced, there has not been found to be any particular advantage to be gained in the quality of the coating produced by using excessive amounts of the metal ions in the solution. Accordingly, in most instances, the metal ions, other than the alkali metal ions, will be present in the solution in amounts within the range of about 0.002% to about 0.10% by weight of the coating solution.

The complexing, chelating or sequestering agent used in the coating compositions of the present invention, functions to complex the metal ions, other than the alkali metal ions, and maintains the same dissolved in the coating solution. A wide variety of such agents have been found to be satisfactory for this purpose including inorganic complexing agents such as cyanides, condensed phosphates, ammonia and the like; organic chelating agents, including the dicarboxylic acids, such as malonic acid, fumaric acid, and the like; amino acid such as glycine; hydroxy carboxylic acids, such as citric acid, gluconic acid, lactic acid, and the like; hydroxy aldehydes such as acetyl acid acetone; polyhydroxyaliphatic compounds such as sorbitol, 1,2-ethane diol; phenolic carboxylic acids, such as salicyclic acid, phthalic acid, and the like; amine carboxylic acids, such as ethylene diamine tetraacetic acid, polyamino acids, such as diethanolaminomethanephosphonate; salts of lower molecular weight, ligno sulfonic acids, as are derived from wood pulping processes, such as sodium ligno sulfonate; and the like. Of these, excellent results have been obtained when using sodium hexahydroxyheptoate, sodium gluconate, beta-hydroxyheptoate, sodium beta-glucoheptoate, and the sodium salt of ethylene diamine tetraacetic acid, and for this reason, these complexing agents are preferred.

The complexing agent is present in the coating solution in an amount at least sufficient to completely complex the metal ion or ions, other than the alkali metal ions which are present. Inasmuch as the concentration of the complexing agent will, of necessity be increased as the conconcentration of the metallic ion increases, it is preferred to use complexing agents in the form of neutral salts, particularly the alkali metal salts, rather than an acid form which tends to decrease the effective alkali strength of the solution. Although quantities of the complexing agent up to its maximum solubility in the coating solution may be used, there has been found to be no advantage obtained from using concentrations of the complexing agents in excess of those which are needed to maintain the desired metal ions in the coating solution.

The phosphate ions in the composition of the present invention may be added in any convenient water-soluble and/or dispersible form. Preferably, the phosphate ions are added as the alkali metal phosphate, such as trisodium phosphate, or the like, so as to avoid decreasing the effective alkalinity of the treating solution. If desired, the phosphate ions may be added as phosphoric acid, rather than as an alkaline phosphate. In such instances, it may be desirable to add additional amounts of the alkali metal hydroxide, such as sodium hydroxide, to the composition in oder to compensate for the acidity added by the phosphoric acid, and maintain the pH of the treating solution at the desired level. As has been noted hereinabove, the phosphate ions are present in the solution in an amount of at least 0.75% by weight of the coating solution and are preferably present in an amount within the range of about 1 to about 1.5% by weight of the treating solution.

In a most preferred embodiment, it has been found that excellent results are obtained when using a combination of metal ions, in addition to the alkali metal ions, particularly cobalt and iron, and using as the sequestering agent, beta-hydroxyheptoate or sodium-beta-glucoheptoate. Exemplary of such a preferred coating composition is one containing the following components in the amounts indicated:

| Component | Percent by weight |
|---|---|
| Sodium hydroxide | 3.0 |
| Sequestering agent | 0.2 |
| Cobalt ions | 0.03 |
| Iron ions (ferric) | 0.02 |
| Phosphate ion | 1.0 |
| Water | Balance |

The aqueous alkaline coating solution may be applied to the metal surfaces to be coated using various techniques including spraying, immersion, brushing, flowing, or the like, with spraying techniques being preferred. Although the coating solution may be at any temperature between ordinary room temperature, i.e., 20 degrees centigrade, and the boiling point of the solution, it is desirably used at an elevated temperature within the range of about 30 to 100 degrees centigrade, with temperatures within the range of about 40 to 70 degrees centigrade being preferred. The coating solution is maintained in contact with the surface for a period of time sufficient to effect the formation of the desired coating, typical contact times being within the range of about 2 seconds to 2 minutes, with contact times of from 10 seconds to 90 seconds being preferred.

Following the application of the aqueous alkaline coating solutions, the treated surface may be rinsed, by using a dilute aqueous chromic acid solutions, such as one containing about 0.01 to 0.5% chromic acid. Alternatively, a rinse solution containing a chromium chromate complex may also be used. After the use of such rinses, the coating may be water rinsed, and/or dried without rinsing, as desired, to provide an excellent base for paint or similar coatings.

The process of the present invention has been found to be useful in forming coatings on the surfaces of pure zinc, electroplated zinc, hot dip zinc surfaces, including hot dip zinc containing small quantities of alloy ingredients, such as aluminum and the like, zinc alloys per se, or electrodeposited zinc alloy surfaces. Additionally, surfaces which include iron or steel in addition to zinc or zinc alloys, such as a partially galvanized steel or iron base, or a composite article which includes assembled steel or iron portions and zinc or zinc alloy portions may also be treated. In treating such articles, the process of the present invention is carried out in the manner which has been described hereinabove, after which the coated surface is subjected to a conventional phosphate coating step. For this purpose, various aqueous acidic zinc phosphate solutions or alkali metal phosphate solutions, as are well known to those in the art, may be used.

In order that those skilled in the art may better understand the present invention and the manner in which it may be practiced, the following specific examples are given. In these examples unless otherwise indicated, temperatures are in degrees centigrade and parts and percents are by weight. It is to be appreciated, however, that these examples are merely illustrative of the present invention and are not to be taken as a limitation thereof.

EXAMPLE 1

An aqueous alkaline coating solution was formulated containing 3.0% NaOH, 0.2% sodium hydroxyheptoate, 0.03% cobalt, added as cobalt nitrate hexahydrate, 0.02% ferric iron, added as ferric nitrate nonahydrate, 0.4% zinc and 1.0% $PO_4\equiv$, added as trisodium phosphate. This solution, which was equivalent to an aged coating bath, produced excellent paint-base coatings on hot dip galvanized parts when applied by spraying or immersion. Upon heating this solution for 28 hours at 93° centigrade a soft precipitate was formed which was very easily removed from the coating equipment.

EXAMPLE 2

By way of comparison, a coating solution was formulated as in Example 1 with the exception that it did not contain any $PO_4\equiv$. After heating this solution for 28 hours at 93° centigrade a hard, crystalline precipitate had formed which adhered very tightly to the coating equipment and could be removed only with great difficulty.

The procedure of Example 1 was repeated using coating solutions containing 0.75 and 1.5% $PO_4$. In each instance, a soft, easily removed precipitate was formed after heating for 28 hours at 93° centigrade.

While there have been described various embodiments of the invention, the compositions and methods described are not intended to be understood as limiting the scope of the invention, as changes therewithin are possible and it is intended that each element recited in any of the following claims is to be understood as referring to all equivalent elements for accomplishing the same results in substantially the same or equivalent manner, it being intended to cover the invention broadly in whatever form its principle may be utilized.

What is claimed is:

1. A composition suitable for coating zinc and zinc alloy surfaces which consists essentially of an aqueous alkaline solution having a pH of at least about 11 and containing alkali metal ions, added as alkaline salts, in an amount, in combination with the other solution components, sufficient to maintain the pH of the solution at at least about 11 during the coating process, at least one metal ion other than an alkali metal ion selected from the group consisting of silver, magnesium, cadmium, aluminum, tin, titanium, antimony, molybdenum, chromium, cerium, tungsten, manganese, cobalt, ferrous and ferric iron, and nickel, which metal ion is present in an amount of at least about 0.002% by weight of the solution, a complexing agent in the solution in an amount sufficient to hold said other metal ions in the solution, and at least 0.75% by weight of the solution of phosphate ions.

2. The composition as claimed in claim 1 wherein in addition to the alkali metal ion, the solution contains iron and cobalt ions.

3. The composition as claimed in claim 2 wherein the phosphate ion is present in an amount within the range of about 1 to about 1.5% by weight of the solution.

4. A method for treating zinc and zinc alloy surfaces which comprises applying to the surface to be treated the coating composition as claimed in claim 1, and maintaining the solution in contact with the surface for a period sufficient to effect the formation of the desired coating.

5. The method as claimed in claim 6 wherein the coating solution contains, in addition to the alkali metal ion, iron and cobalt ions.

6. The method as claimed in claim 5 wherein the phosphate ions are present in the coating solution in an amount within the range of about 1 to about 1.5% by weight of the coating solution.

References Cited

UNITED STATES PATENTS 2,850,416  9/1958  Castle _____ 148—6.14

ALFRED L. LEAVITT, Primary Examiner

W. E. BALL, Assistant Examiner

U.S. Cl. X.R.

148—6.15